United States Patent
Wang et al.

(10) Patent No.: US 11,093,335 B2
(45) Date of Patent: Aug. 17, 2021

(54) DATA REPLICATION METHOD, APPARATUS, AND SYSTEM

(71) Applicant: Huawei Technologies Co., Ltd., Shenzhen (CN)

(72) Inventors: Xiuwu Wang, Chengdu (CN); Ji Ouyang, Chengdu (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 1015 days.

(21) Appl. No.: 15/405,996

(22) Filed: Jan. 13, 2017

(65) Prior Publication Data

US 2017/0132085 A1 May 11, 2017

Related U.S. Application Data

(63) Continuation of application No. PCT/CN2014/082229, filed on Jul. 15, 2014.

(51) Int. Cl.
*G06F 11/14* (2006.01)
*G06F 16/27* (2019.01)
*G06F 11/20* (2006.01)

(52) U.S. Cl.
CPC ......... *G06F 11/1446* (2013.01); *G06F 11/14* (2013.01); *G06F 11/1451* (2013.01);
(Continued)

(58) Field of Classification Search
None
See application file for complete search history.

(56) References Cited

U.S. PATENT DOCUMENTS 8,250,033 B1 8/2012 De Souter et al.
2004/0260894 A1 12/2004 Keohane et al.
(Continued)

FOREIGN PATENT DOCUMENTS

CN 1704903 A 12/2005
CN 101266565 A 9/2008
(Continued)

OTHER PUBLICATIONS

Foreign Communication From A Counterpart Application, Chinese Application No. 201480080641.0, Chinese Office Action dated Nov. 13, 2018, 5 pages.
(Continued)

*Primary Examiner* — Mark D Featherstone
*Assistant Examiner* — Samuel C Sharpless, III
(74) *Attorney, Agent, or Firm* — Conley Rose, P.C.

(57) ABSTRACT

A data replication method to diminish an impact caused by frequently starting a snapshot on performance of a primary storage array and a system host, where the method includes obtaining differential data information corresponding to differential data, where the differential data information includes a storage address of the differential data, and a determining value of the differential data, replicating the differential data from the primary volume to the secondary volume according to the storage address of the differential data that is located in the primary volume when the determining value is not less than a preset threshold, and taking a snapshot for the primary volume when the determining value is less than the preset threshold and replicating the differential data to the secondary volume.

22 Claims, 5 Drawing Sheets

(52) U.S. Cl.
CPC .......... *G06F 11/2074* (2013.01); *G06F 16/27* (2019.01); *G06F 11/1461* (2013.01); *G06F 11/1464* (2013.01); *G06F 11/2066* (2013.01); *G06F 2201/84* (2013.01)

(56) References Cited

U.S. PATENT DOCUMENTS

| | | | |
|---|---|---|---|
| 2005/0102480 A1 | 5/2005 | Yagisawa et al. | |
| 2005/0172092 A1 | 8/2005 | Lam et al. | |
| 2005/0216682 A1* | 9/2005 | Shinozaki | G06F 11/1456 711/162 |
| 2006/0277376 A1 | 12/2006 | Watanabe et al. | |
| 2009/0164608 A1 | 6/2009 | Komaki | |
| 2009/0222499 A1* | 9/2009 | Tan | G06F 11/1461 |
| 2009/0240899 A1 | 9/2009 | Akagawa et al. | |
| 2009/0265520 A1* | 10/2009 | Geng | G06F 11/1451 711/162 |
| 2011/0029748 A1 | 2/2011 | Nakamura et al. | |
| 2011/0295809 A1* | 12/2011 | Tatebe | G06F 11/1456 707/640 |
| 2012/0233123 A1 | 9/2012 | Shisheng et al. | |
| 2013/0086345 A1* | 4/2013 | Endoh | G06F 11/1448 711/162 |

FOREIGN PATENT DOCUMENTS

| | | |
|---|---|---|
| CN | 103617096 A | 3/2014 |
| EP | 1693756 B1 | 9/2007 |
| JP | 2006235737 A | 9/2006 |
| JP | 2006338250 A | 12/2006 |
| JP | 2007241623 A | 9/2007 |
| JP | 2007334913 A | 12/2007 |
| JP | 2009157471 A | 7/2009 |
| JP | 2009230383 A | 10/2009 |
| JP | 2011034164 A | 2/2011 |
| WO | 9820419 A1 | 5/1998 |

OTHER PUBLICATIONS

Foreign Communication From A Counterpart Application, Chinese Application No. 201480080641.0, Chinese Search Report dated Nov. 5, 2018, 2 pages.
Foreign Communication From A Counterpart Application, Japanese Application No. 2017-500888, Japanese Decision for Grant dated Oct. 30, 2018, 2 pages.
Machine Translation and Abstract of Japanese Publication No. JP2007241623, Sep. 20, 2007, 6 pages.
Machine Translation and Abstract of Japanese Publication No. JP2007334913, Dec. 27, 2007, 18 pages.
Foreign Communication From A Counterpart Application, Japanese Application No. 2017-500888, Japanese Notice of Rejection dated Feb. 20, 2018, 2 pages.
Foreign Communication From A Counterpart Application, Japanese Application No. 2017-500888, English Translation of Japanese Notice of Rejection dated Feb. 20, 2018, 4 pages.
Machine Translation and Abstract of Chinese Publication No. CN1704903, Dec. 7, 2005, 11 pages.
Machine Translation and Abstract of Chinese Publication No. CN103617096, Mar. 5, 2014, 19 pages.
Merchant, A., et al., Performance Analysis of Dynamic Finite Versioning for Concurrent Transaction and Query Processing, XP058221958, Performance Evaluation Review, vol. 20, No. 1, Jun. 1992, pp. 103-114.
Foreign Communication From a Counterpart Application, European Application No. 14897806.7, Extended European Search Report dated Apr. 26, 2017, 10 pages.
Foreign Communication From A Counterpart Application, PCT Application No. PCT/CN2014/082229, English Translation of International Search Report dated Mar. 27, 2015, 2 pages.
Foreign Communication From A Counterpart Application, PCT Application No. PCT/CN2014/082229, English Translation of Written Opinion dated Mar. 27, 2015, 9 pages.
Foreign Communication From A Counterpart Application, Chinese Application No. 14897806.7, Chinese Office Action dated Nov. 20, 2018, 5 pages.

* cited by examiner

DATA REPLICATION METHOD, APPARATUS, AND SYSTEM

CROSS-REFERENCE TO RELATED APPLICATIONS

This application is a continuation of International Patent Application No. PCT/CN2014/082229 filed on Jul. 15, 2014, which is hereby incorporated by reference in its entirety.

TECHNICAL FIELD

The present disclosure relates to the field of storage technologies, and in particular, to a data replication method, apparatus, and system.

BACKGROUND

An existing storage system includes a system host that serves as a party that actually generates data, a primary storage array that stores and controls data generated by the system host, and a secondary storage array that stores and backs up data in the primary storage array. The primary storage array includes a primary storage pool that serves as a data storage device and a primary data storage controller that controls data stored in the primary storage pool. The primary storage pool includes a primary volume that is used to receive and store data sent by the system host and a snapshot volume of the primary volume that is used to store snapshot data of the primary volume. The secondary storage array includes a secondary storage pool that serves as a data storage device and a secondary data storage controller that controls data stored in the secondary storage pool. The secondary storage pool includes a secondary volume that is used to receive and store backup data of the primary volume and a snapshot volume of the secondary volume that is used to store snapshot data of the secondary volume. During a process of generating data, data generated by the system host is sent to the primary volume. The data sent by the system host to the primary volume is continuously backed up to the secondary volume using a data replication technology such that data in the secondary volume and that in the primary volume remains consistent, to achieve a disaster backup effect when data in the system host is damaged.

In other approaches, data replication is implemented based on a snapshot technology. A processing process of the snapshot technology is as follows. A primary data storage controller periodically takes a snapshot for a primary volume, and replicates, using the snapshot, data sent by a system host to the primary volume from the primary volume of a primary storage pool to a secondary volume. In other approaches, a copy-on-write (COW) snapshot or a split-mirror snapshot needs to be taken for the primary volume if data in the primary volume needs to be modified. During a process of starting a snapshot, performance of the system host and a primary storage array is greatly affected, and during a process of snapshot replication, the data sent by the system host to the primary volume cannot be backed up to the secondary volume, thereby increasing an amount of data lost when a disaster occurs.

SUMMARY

Using the present disclosure, the following problems may be resolved. A problem in an existing technical solution that performance of a system host and a primary storage array is severely affected by frequently starting a snapshot, and a problem that during an existing process of snapshot replication, an amount of data lost when a disaster occurs is large because data sent by the system host to a primary volume cannot be synchronized to a secondary volume.

According to a first aspect, an embodiment of the present disclosure provides a data replication method, including obtaining differential data information corresponding to differential data that differentiates a primary volume from a secondary volume, where the differential data information includes a storage address of the differential data that is located in the primary volume, and a differential data determining value of the differential data, and the differential data determining value includes a data amount of the differential data or a ratio of the differential data amount of the differential data to a bandwidth for replication between the primary volume and the secondary volume, replicating the differential data from the primary volume to the secondary volume according to the storage address of the differential data that is located in the primary volume when the differential data determining value is not less than a preset threshold, and taking a snapshot for the primary volume and replicating the differential data to the secondary volume according to the snapshot when the differential data determining value is less than the preset threshold.

With reference to the first aspect, in a first implementation manner of the first aspect, replicating the differential data from the primary volume to the secondary volume according to the storage address of the differential data that is located in the primary volume further includes performing each round of differential data replication according to a sequence of a data replication pointer from a start address in the primary volume to an end address in the primary volume, and replicating the differential data from the primary volume to the secondary volume according to the storage address of the differential data that is located in the primary volume, where the data replication pointer is used to point to an address of differential data that is currently being replicated, and the method includes receiving, by the primary volume, data delivered by a system host during the process of replicating the differential data from the primary volume to the secondary volume according to the storage address of the differential data that is located in the primary volume, replicating the data from the primary volume to the secondary volume in a current round of replication if a storage address of the data that is in the primary volume is located after an address currently indicated by the data replication pointer, and skipping replicating the data in the current round of replication if the storage address of the data that is in the primary volume is located before the address currently indicated by the data replication pointer.

According to a second aspect, an embodiment of the present disclosure provides a primary data storage controller, including a processor, a memory, a communications interface, and a bus, where the processor, the memory, and the communications interface communicate using the bus. The communications interface is configured to communicate with a primary storage pool and a secondary storage pool, where the primary storage pool includes a primary volume and the secondary storage pool includes a secondary volume. The memory is configured to store a program, and the processor is configured to execute the program stored in the memory, to execute the data replication method provided in the first aspect by an embodiment of the present disclosure or the data replication method provided in the first implementation manner of the first aspect by an embodiment of the present disclosure when the primary data storage controller runs.

According to a third aspect, an embodiment of the present disclosure provides a data replication control apparatus, including a differential data information acquiring module configured to obtain differential data information corresponding to differential data that differentiates a primary volume from a secondary volume, where the differential data information includes a storage address of the differential data that is located in the primary volume, and a differential data determining value of the differential data, and the differential data determining value includes a data amount of the differential data or a ratio of the differential data amount of the differential data to a bandwidth for replication between the primary volume and the secondary volume, a data replication module configured to replicate the differential data from the primary volume to the secondary volume according to the storage address of the differential data that is located in the primary volume when the differential data determining value is not less than a preset threshold, and a snapshot replication module configured to take a snapshot for the primary volume and replicate the differential data to the secondary volume according to the snapshot when the differential data determining value is less than the preset threshold.

According to a fourth aspect, an embodiment of the present disclosure provides a data replication system, including the primary data storage controller, the primary storage pool, and the secondary storage pool that are provided in the second aspect by an embodiment of the present disclosure, where the primary storage pool includes a primary volume and the secondary storage pool includes a secondary volume.

According to the embodiments provided in the foregoing, during a process in which differential data that differentiates a primary volume from a secondary volume is replicated from the primary volume to the secondary volume, no snapshot is taken for the primary volume until a differential data determining value decreases to be less than a threshold. Compared with an existing technical solution in which a snapshot is frequently taken for the primary volume, impact caused by frequently starting a snapshot on performance of a system host and a primary storage array is obviously diminished, and in the embodiments of the present disclosure, during a process of directly replicating the differential data, data sent by the host to the primary volume can be replicated to the secondary volume, thereby reducing an amount of data lost when a disaster occurs.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
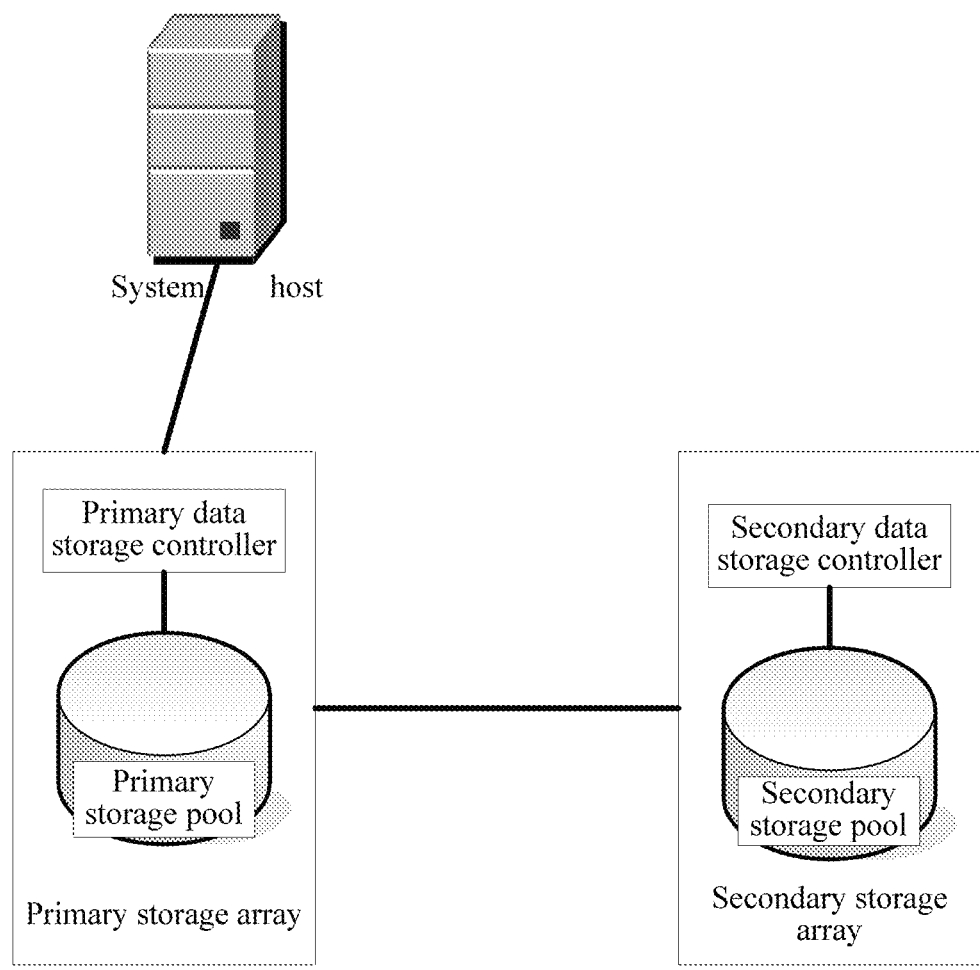
FIG. 1 is a schematic diagram of an architecture of a data replication system applied in an embodiment of the present disclosure.

The embodiments of the present disclosure provide a data replication method, apparatus, and system. As shown in FIG. 1, the data replication system includes a system host, a primary storage array, and a secondary storage array. The system host and the primary storage array establish a communications connection, and the primary storage array and the secondary storage array establish a communications connection. Data sent by the system host to the primary storage array is stored in a primary volume of a primary storage pool, and backup replication data of data in the primary volume is stored in a secondary volume of a secondary storage pool. The primary storage pool and the secondary storage pool are respectively provided with a snapshot volume of the primary volume and a snapshot volume of the secondary volume, which are respectively used to store snapshot data of the primary volume and the secondary volume. The primary storage array further includes a primary data storage controller that controls data stored in the primary storage pool, and the secondary storage array further includes a secondary data storage controller that controls data stored in the secondary storage pool.

Further, the data sent by the system host to the primary storage array is stored in the primary volume, and the primary data storage controller records storage information of the foregoing data that is located in the primary volume, such as a storage address of the foregoing data that is located in the primary volume and a data amount of the foregoing data. In addition, the primary data storage controller implements a preset data replication policy, and replicates the foregoing data from the primary storage pool to the secondary volume according to the storage data of the foregoing data that is located in the primary volume, where the storage information is recorded in the primary data storage controller. During a process of replication, snapshot data that is generated due to starting of a snapshot for the primary volume is stored in the snapshot volume of the primary volume. The secondary data storage controller records storage information that is in the secondary volume and is of data replicated from the primary storage pool to the secondary volume. During a process in which the secondary volume receives the data that is replicated from the primary storage pool to the secondary volume, snapshot data that is generated by starting a snapshot for the secondary volume is stored in the snapshot volume of the secondary volume.

Based on the foregoing content, the embodiments of the present disclosure provide a data replication method, apparatus, and system.

Method Embodiment 1

Figure 2:
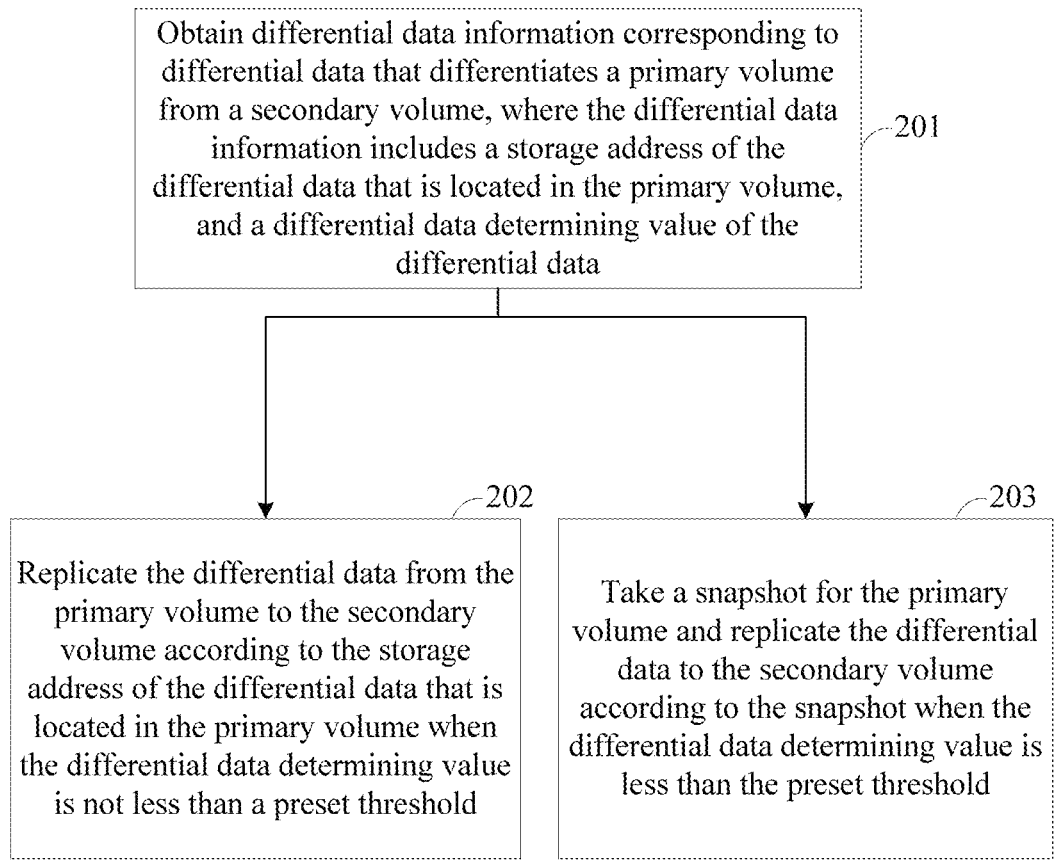
FIG. 2 is a schematic flowchart of a data replication method applied in an embodiment of the present disclosure.

Method Embodiment 1 of the present disclosure provides a data replication method, of which a flowchart is shown in FIG. 2. The method includes the following steps.

Step 201: Obtain differential data information corresponding to differential data that differentiates a primary volume from a secondary volume, where the differential data information includes a storage address of the differential data that is located in the primary volume, and a differential data determining value of the differential data, where the differential data determining value includes a data amount of the differential data or a ratio of the differential data amount of the differential data to a bandwidth for replication between the primary volume and the secondary volume.

A primary data storage controller obtains, according to data information that is sent by a system host to the primary volume and recorded by the primary data storage controller and data information replicated from the primary volume to the secondary volume, the differential data information of the differential data differentiating the primary volume from the secondary volume. The foregoing differential data information includes the storage address of the differential data that is located in the primary volume and the differential data determining value of the differential data. The foregoing differential data determining value includes the data amount of the differential data. In addition, if the primary data storage controller records the bandwidth for replication between the primary volume and the secondary volume, with reference to the foregoing data amount of the differential data, time required for replicating the differential data from the primary volume to the secondary volume, that is, a ratio of the foregoing data amount of the differential data to the bandwidth for replication between the primary volume and the secondary volume, may be obtained. The ratio can also be used as the differential data determining value, and the foregoing bandwidth for replication is a communication bandwidth used when data is replicated between the primary volume and the secondary volume.

Step 202 Replicate the differential data from the primary volume to the secondary volume according to the storage address of the differential data that is located in the primary volume when the differential data determining value is not less than a preset threshold.

The preset threshold refers to a threshold corresponding to the differential data determining value in step 201. That is, the foregoing preset threshold is a data amount if the data amount of the differential data is selected as the differential data determining value in step 201, or the foregoing preset threshold is a ratio if the ratio of the differential data amount of the differential data to the bandwidth for replication between the primary volume and the secondary volume is selected as the differential data determining value in step 201. After the primary data storage controller determines that the foregoing differential data determining value is greater than or equal to the foregoing preset threshold, the differential data is replicated from the primary volume to the secondary volume according to the storage address of the differential data that is located in the primary volume. During a process of replication, the primary data storage controller records the differential data information of the differential data replicated from the primary volume to the secondary volume. In addition, the primary data storage controller also records data information corresponding to the data sent by the system host to the primary volume if the system host sends data to the primary volume during the process of replication. The data information includes a data amount corresponding to the data sent by the system host to the primary volume during the process of replication and a storage location that is in the primary volume and is of the data sent by the system host to the primary volume such that during the process of replication, the primary data storage controller can update the differential data information of the differential data differentiating the primary volume from the secondary volume.

Step 203 Take a snapshot for the primary volume and replicate the differential data to the secondary volume according to the snapshot when the differential data determining value is less than the preset threshold.

After the primary data storage controller determines that the foregoing differential data determining value is less than the foregoing preset threshold, a snapshot is taken for the foregoing primary volume, where the foregoing snapshot may be a COW snapshot or a split-mirror snapshot, and the differential data is replicated to secondary volume according to the snapshot.

A process of taking a COW snapshot for the primary volume is as follows. A mapping table and a resource volume are established in a snapshot volume of the primary volume when a COW snapshot is established, and a pointer recorded in the mapping table points to a data block in the primary volume, where the pointer recorded in the mapping table includes a pointer that points to the differential data. During existence of the COW snapshot, original primary volume data stored in storage space that is allocated to the foregoing data and is in the primary volume is replicated to the resource volume if the system host sends data to the primary volume, and then the foregoing data is stored into the storage space allocated in the primary volume. In addition, a pointer that is recorded in the mapping table and points to the original primary volume data stored in the primary volume is changed to point to original primary volume data that is replicated to the resource volume for storage. During the existence of the COW snapshot, regardless of whether there is data stored, during the process of replication, into storage space that stores the differential data and is in the primary volume, it can be ensured that the pointer that is recorded in the mapping table and points to the differential data points to differential data to which the pointer points when the COW snapshot is established, and the differential data is replicated to the secondary volume using the pointer that is recorded in the mapping table and points to the differential data. When differential data existing when the COW snapshot is established is all replicated from the primary volume to the secondary volume, the COW snapshot is canceled.

Taking a split-mirror snapshot for the primary volume is as follows. Primary volume data is replicated to the snapshot volume of the primary volume when a split-mirror snapshot is established. Then the differential data that differentiates the primary volume from the secondary volume is converted into differential data that differentiates the snapshot volume of the primary volume from the secondary volume, and the differential data that differentiates the snapshot volume of the primary volume from the secondary volume is replicated from the snapshot volume of the primary volume to the secondary volume. During existence of the split-mirror snapshot, the foregoing data is directly stored in the primary volume if the system host sends data to the primary volume, and the split-mirror snapshot is canceled when differential data existing when the split-mirror snapshot is established is all replicated from the snapshot volume of the primary volume to the secondary volume.

In this method embodiment, a primary data storage controller directly replicates differential data from a primary volume to a secondary volume when a differential data determining value is greater than or equal to a preset threshold, thereby greatly reducing a quantity of times of starting a snapshot for the primary volume, and diminishing impact caused by frequently starting a snapshot on performance of a system host and a primary storage array.

Method Embodiment 2

In Method Embodiment 2 of the present disclosure, based on Method Embodiment 1 of the present disclosure, before the differential data determining value is compared with the preset threshold, that is, before it is determined in step 202 that the differential data determining value is greater than or equal to the preset threshold or it is determined in step 203 that the differential data determining value is less than the preset threshold, a snapshot is taken for the secondary volume, where the foregoing snapshot may be a COW snapshot or a split-mirror snapshot. After differential data existing when the snapshot for the primary volume is started is all replicated to the secondary volume, that is, after the differential data is replicated to the secondary volume according to the snapshot in step 203, a snapshot for the secondary volume is canceled.

In this method embodiment, before differential data is replicated from a primary volume to a secondary volume, a snapshot is taken for the secondary volume, and a snapshot for the secondary volume is canceled after the differential data existing when a snapshot for the primary volume is started is all replicated to the secondary volume, thereby ensuring that during a process in which the secondary volume receives the differential data, data in the secondary volume may be rolled back to a state at a moment when the snapshot for the secondary volume is started.

Method Embodiment 3

Figure 3A:
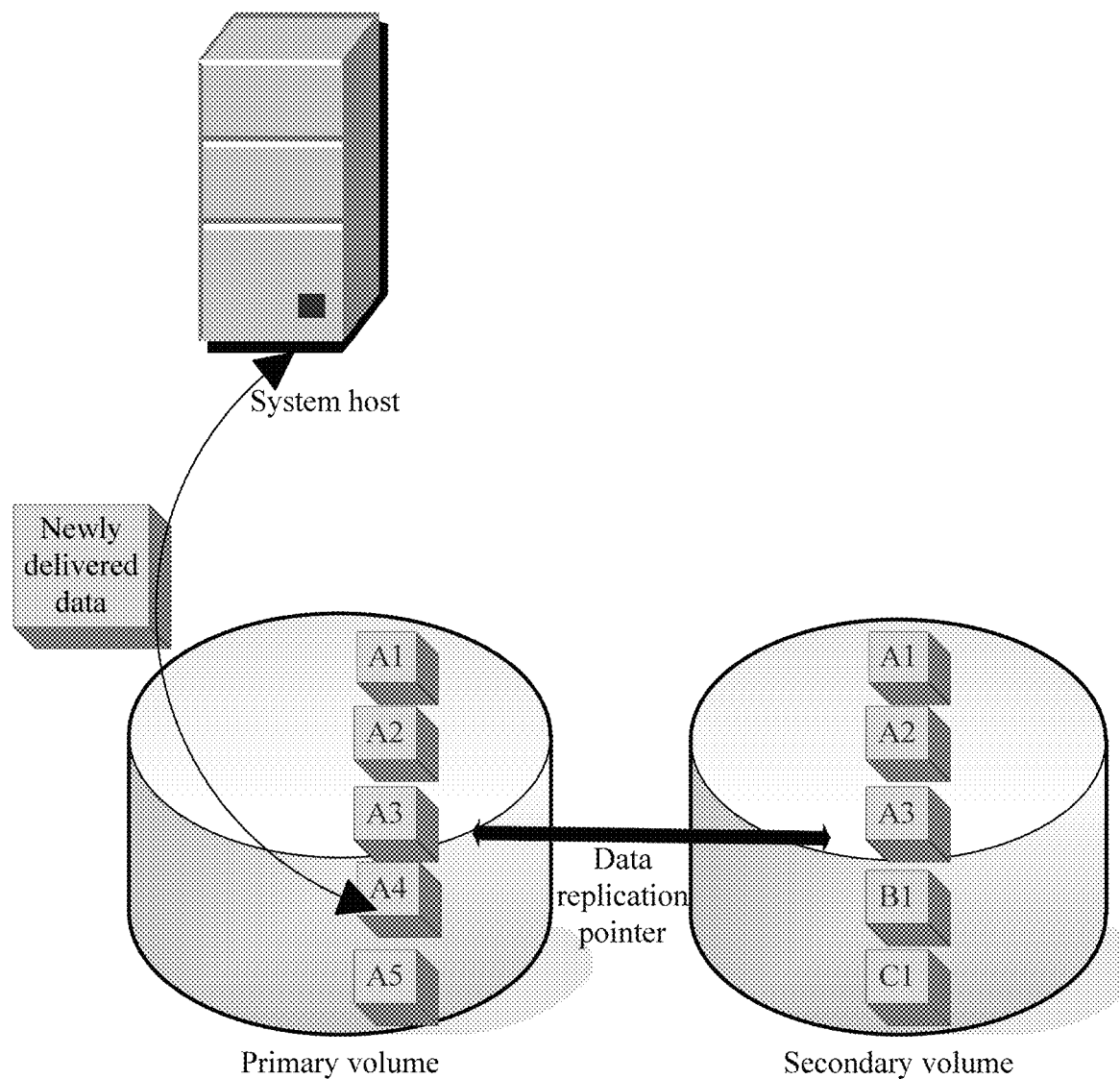
FIG. 3A and FIG. 3B are schematic flowcharts of another data replication method applied in an embodiment of the present disclosure.

In Method Embodiment 3 of the present disclosure, based on Method Embodiment 1, replicating the differential data from the primary volume to the secondary volume according to the storage address of the differential data that is located in the primary volume in step 202 in Method Embodiment 1 further includes performing each round of differential data replication according to a sequence in which a data replication pointer points to from a start address in the primary volume to an end address in the primary volume. As shown in FIG. 3A, the data replication pointer runs according to a sequence from A1 to A5 and points to an address of differential data currently being replicated, and the differential data is replicated from the primary volume to the secondary volume according to a storage address of the differential data that is located in the primary volume.

Figure 3B:
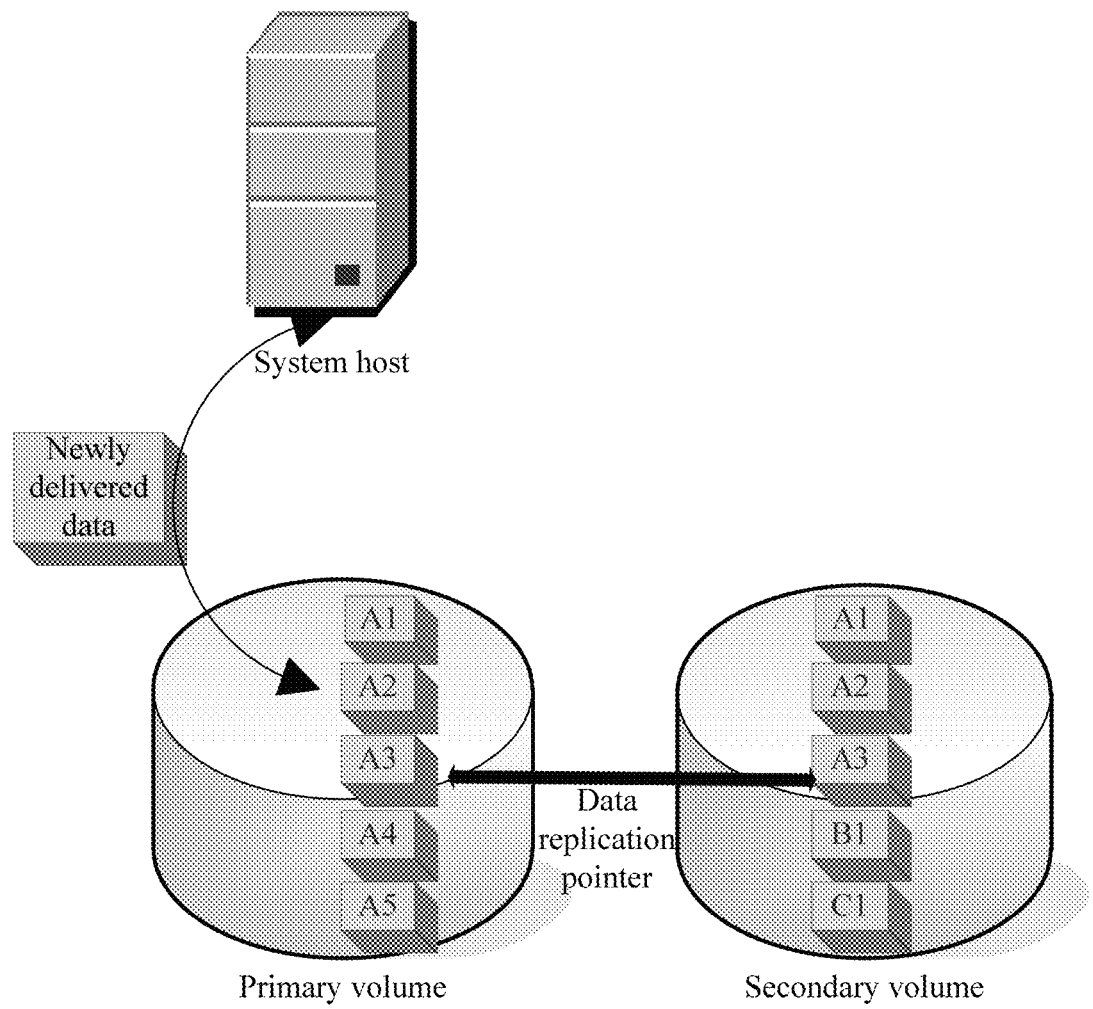

Within a period when the differential data is replicated from the primary volume to the secondary volume, the system host sends data to the primary volume. If a storage address of the data sent by the system host that is located in the primary volume is located after an address to which the data replication pointer currently points, that is, as shown in FIG. 3A, the data sent by the system host is stored in a location of A4 in the primary volume and the data replication pointer currently points to a location of A3, the foregoing data sent by the system host is replicated in a current round of replication. If the storage address of the data sent by the system host that is located in the primary volume is located before the address to which the data replication pointer currently points, that is, as shown in FIG. 3B, the data sent by the system host is stored in a location of A2 in the primary volume and the data replication pointer currently points to the location of A3, the foregoing data sent by the system host is not replicated in the current round of replication. After being stored at the location of A2, the foregoing data sent by the system host is replicated to the secondary volume during a process of a next round of differential data replication.

Figure 4:
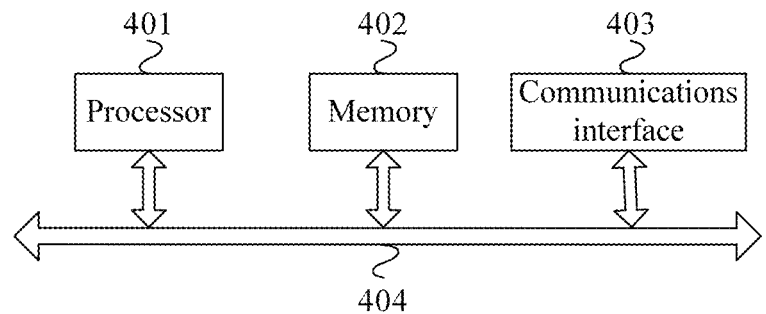
FIG. 4 is a schematic structural diagram of composition of a device applied in an embodiment of the present disclosure.

Device Embodiment 1 of the present disclosure provides a primary data storage controller, and as shown in FIG. 4, the primary data storage controller at least includes a processor 401, a memory 402, a communications interface 403, and a bus 404, where the processor 401, the memory 402, and the communications interface 403 communicate using the bus 404.

The memory 402 is configured to store a program. Further, the program may include program code, where the program code includes a computer operation instruction. The memory 402 may be a high-speed random access memory (RAM) memory, or may be a non-volatile memory, such as at least one disk storage.

The processor 401 is configured to execute the operation instruction stored in the memory 402, and may be a single-core or a multi-core central processing unit (CPU), an application specific integrated circuit (ASIC), or one or more integrated circuits configured to implement this embodiment of the present disclosure.

The communications interface 403 is configured to communicate with a primary storage pool and a secondary storage pool, where the primary storage pool includes a primary volume and the secondary storage pool includes a secondary volume.

The processor 401 runs the program, to execute any one of the foregoing Method Embodiment 1, Method Embodiment 2, and Method Embodiment 3 when the controller runs.

Figure 5:
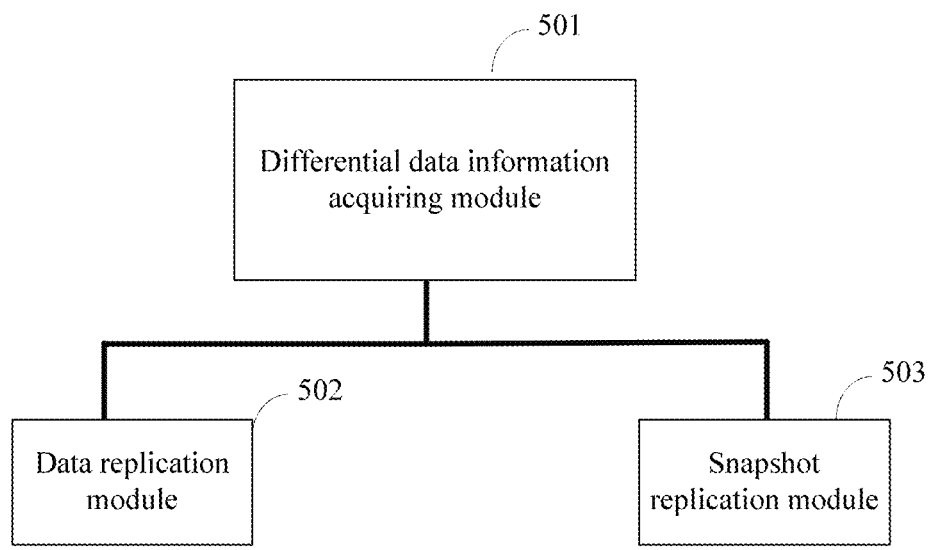
FIG. 5 is a schematic structural diagram of composition of an apparatus applied in an embodiment of the present disclosure.

Corresponding to the foregoing method embodiments of the present disclosure, Apparatus Embodiment 2 of the present disclosure provides a data replication control apparatus, and as shown in FIG. 5, the apparatus includes a differential data information acquiring module 501 configured to obtain differential data information corresponding to differential data that differentiates a primary volume from a secondary volume, where the differential data information includes a storage address of the differential data that is located in the primary volume, and a differential data determining value of the differential data, where the differential data determining value includes a data amount of the differential data or a ratio of the data amount of the differential data to a bandwidth for replication between the primary volume and the secondary volume, a data replication module 502 configured to replicate the differential data from the primary volume to the secondary volume according to the storage address of the differential data that is located in the primary volume when the differential data determining value is not less than a preset threshold, and a snapshot replication module 503 configured to take a snapshot for the primary volume and replicate the differential data to the secondary volume using the snapshot when the differential data determining value is less than the preset threshold.

Figure 6:
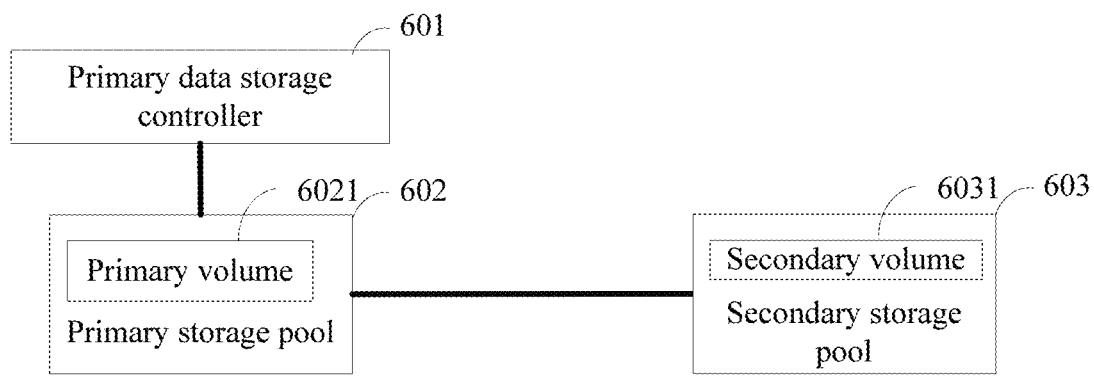
FIG. 6 is a schematic structural diagram of composition of a system applied in an embodiment of the present disclosure.

The present disclosure further provides an embodiment of a data replication system as shown in FIG. 6, and the system includes a primary data storage controller 601, a primary storage pool 602, and a secondary storage pool 603 that are provided in the foregoing apparatus embodiment, where the primary storage pool 602 includes a primary volume 6021 and the secondary storage pool 603 includes a secondary volume 6031. The primary data storage controller 601 establishes communication with the primary storage pool 602, and the primary storage pool 602 establishes communication with the secondary storage pool 603.

An embodiment of the present disclosure further provides a computer-readable medium, including a computer operation instruction, where the computer operation instruction is configured to execute the methods described in any one of method embodiments of the present disclosure by a controller.

It should be noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also understand that all the embodiments described in this specification belong to exemplary embodiments, and the involved actions and modules are not necessarily mandatory to the present disclosure.

In the foregoing embodiments, the description of each embodiment has respective focuses. For a part that is not described in detail in an embodiment, reference may be made to related descriptions in other embodiments.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation. The computer-readable medium may include a RAM, a read-only memory (ROM), an electrically erasable programmable ROM (EEPROM), a compact disc-ROM (CD-ROM), or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and a disc used by the present disclosure includes a compact disc (CD), a laser disc, an optical disc, a digital versatile disc (DVD), a floppy disk and a BLU-RAY DISC, where the disk generally copies data by a magnetic means, and the disc copies data optically by a laser means. The foregoing combination should also be included in the protection scope of the computer-readable medium.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A data replication method comprising:
    obtaining differential data information corresponding to differential data that differentiates a primary volume from a secondary volume, wherein the differential data information comprises a storage address of the differential data that is located in the primary volume and a determining value of the differential data, and wherein the determining value comprises a ratio of a data amount of the differential data to a bandwidth for replication between the primary volume and the secondary volume;
    recording the bandwidth;
    replicating the differential data from the primary volume to the secondary volume according to the storage address of the differential data that is located in the primary volume when the determining value is not less than a preset threshold; and
    taking a snapshot for the primary volume and replicating the differential data to the secondary volume according to the snapshot when the determining value is less than the preset threshold,
    wherein replicating the differential data from the primary volume to the secondary volume comprises:
        updating the differential data information by recording the differential data information of the differential data replicated from the primary volume to the secondary volume and by recording data information corresponding to data from a system host; and
        taking no snapshot for the primary volume until the determining value decreases to be less than the preset threshold.

2. The data replication method according to claim 1, wherein the replicating the differential data comprises performing each round of differential data replication according to a sequence in which a data replication pointer points from a start address in the primary volume to an end address in the primary volume.

3. The data replication method according to claim 2, wherein replicating the differential data further comprises replicating the differential data from the primary volume to the secondary volume according to the storage address of the differential data that is located in the primary volume, wherein the data replication pointer is used to point to an address of differential data that is currently being replicated.

4. The data replication method according to claim 3, wherein when replicating the differential data from the primary volume to the secondary volume according to the storage address of the differential data that is located in the primary volume, the method further comprises:
    receiving, by the primary volume and from the system host, the data;
    replicating the data from the primary volume to the secondary volume in a current round of replication when a storage address of the data that is in the primary volume is located after an address to which the data replication pointer currently points; and skipping replicating the data in the current round of replication when the storage address of the data that is in the primary volume is located before the address currently indicated by the data replication pointer.

5. The data replication method according to claim 1, further comprising obtaining a time required for the replication as the ratio.

6. The data replication method according to claim 5, wherein replicating the differential data from the primary volume to the secondary volume according to the storage address comprises:

performing each round of differential data replication according to a sequence in which a data replication pointer points from a start address in the primary volume to an end address in the primary volume; and replicating the differential data from the primary volume to the secondary volume according to the storage address of the differential data that is located in the primary volume, wherein the data replication pointer is used to point to an address of differential data that is currently being replicated.

7. The data replication method according to claim 6, wherein when replicating the differential data from the primary volume to the secondary volume according to the storage address of the differential data that is located in the primary volume, the method further comprises:

receiving, by the primary volume and from the system host, the data;

replicating the data from the primary volume to the secondary volume in a current round of replication when a storage address of the data that is in the primary volume is located after an address to which the data replication pointer currently points; and skipping replicating the data in the current round of replication when the storage address of the data that is in the primary volume is located before the address currently indicated by the data replication pointer.

8. A primary data storage controller comprising:
a memory configured to store a program;
a communications interface coupled to the memory using a bus and configured to communicate with a primary storage pool and a secondary storage pool, wherein the primary storage pool comprises a primary volume and wherein the secondary storage pool comprises a secondary volume; and
a processor coupled to the memory and the communications interface using the bus and configured to:
obtain differential data information corresponding to differential data that differentiates the primary volume from the secondary volume, wherein the differential data information comprises a storage address of the differential data that is located in the primary volume, and a determining value of the differential data, and wherein the determining value comprises a ratio of a data amount of the differential data to a bandwidth for replication between the primary volume and the secondary volume;
record the bandwidth;
replicate the differential data from the primary volume to the secondary volume according to the storage address of the differential data that is located in the primary volume when the determining value is not less than a preset threshold; and
take a snapshot for the primary volume and replicate the differential data to the secondary volume according to the snapshot when the determining value is less than the preset threshold,
wherein replicating the differential data from the primary volume to the secondary volume comprises:
updating the differential data information by recording the differential data information of the differential data replicated from the primary volume to the secondary volume and by recording data information corresponding to data from a system host; and
taking no snapshot for the primary volume until the determining value decreases to be less than the preset threshold.

9. The primary data storage controller according to claim 8, wherein when replicating the differential data, the processor is further configured to perform each round of differential data replication according to a sequence in which a data replication pointer points to from a start address in the primary volume to an end address in the primary volume.

10. The primary data storage controller according to claim 9, wherein when replicating the differential data, the processor is further configured to replicate the differential data from the primary volume to the secondary volume according to the storage address of the differential data that is located in the primary volume, wherein the data replication pointer is used to point to an address of differential data that is currently being replicated.

11. The primary data storage controller according to claim 10, wherein when replicating the differential data from the primary volume to the secondary volume according to the storage address of the differential data that is located in the primary volume, the processor is further configured to:
receive, by the primary volume and from the system host, the data;
replicate the data from the primary volume to the secondary volume in a current round of replication when a storage address of the data that is in the primary volume is located after an address to which the data replication pointer currently points; and
skip replicating the data in the current round of replication when the storage address of the data that is in the primary volume is located before the address currently indicated by the data replication pointer.

12. The primary data storage controller according to claim 8, further comprising obtaining a time required for the replication as the ratio.

13. The primary data storage controller according to claim 12, wherein when replicating the differential data from the primary volume to the secondary volume according to the storage address, the processor is further configured to:
perform each round of differential data replication according to a sequence in which a data replication pointer points to from a start address in the primary volume to an end address in the primary volume; and
replicate the differential data from the primary volume to the secondary volume according to the storage address of the differential data that is located in the primary volume, wherein the data replication pointer is used to point to an address of differential data that is currently being replicated.

14. The primary data storage controller according to claim 13, wherein when replicating the differential data from the primary volume to the secondary volume according to the storage address of the differential data that is located in the primary volume, the processor is further configured to:
receive, by the primary volume data seize by a and from the system host, the data;

replicate the data from the primary volume to the secondary volume in a current round of replication when a storage address of the data that is in the primary volume is located after an address to which the data replication pointer currently points; and skip replicating the data in the current round of replication when the storage address of the data that is in the primary volume is located before the address currently indicated by the data replication pointer.

15. A computer program product comprising instructions that are stored on a non-transitory computer-readable medium and that, when executed by a processor, cause a primary data storage to:

obtain differential data information corresponding to differential data that differentiates a primary volume from a secondary volume, wherein the differential data information comprises a storage address of the differential data that is located in the primary volume and a determining value of the differential data, and wherein the determining value comprises a ratio of a data amount of the differential data to a bandwidth for replication between the primary volume and the secondary volume;

record the bandwidth;

replicate the differential data from the primary volume to the secondary volume according to the storage address of the differential data that is located in the primary volume when the determining value is not less than a preset threshold, wherein while replicating the differential data from the primary volume to the secondary volume, no snapshot is taken for the primary volume until the determining value decreases to be less than the preset threshold; and take a snapshot for the primary volume and replicate the differential data to the secondary volume according to the snapshot when the determining value is less than the preset threshold, wherein replicating the differential data from the primary volume to the secondary volume comprises:

updating the differential data information by recording the differential data information of the differential data replicated from the primary volume to the secondary volume and by recording data information corresponding to data from a system host; and taking no snapshot for the primary volume until the determining value decreases to be less than the preset threshold.

16. The computer program product according to claim 15, wherein when replicating the differential data, the instructions further cause the primary data storage to perform each round of differential data replication according to a sequence in which a data replication pointer points to from a start address in the primary volume to an end address in the primary volume.

17. The computer program product according to claim 16, wherein when replicating the differential data, the instructions further cause the primary data storage replicate the differential data from the primary volume to the secondary volume according to the storage address of the differential data that is located in the primary volume, wherein the data replication pointer is used to point to an address of differential data that is currently being replicated.

18. The computer program product according to claim 17, wherein when replicating the differential data from the primary volume to the secondary volume according to the storage address of the differential data that is located in the primary volume, the instructions further cause the primary data storage to:

receive, by the primary volume and from the system host, the data;

replicate the data from the primary volume to the secondary volume in a current round of replication when a storage address of the data that is in the primary volume is located after an address to which the data replication pointer currently points; and skip replicating the data in the current round of replication when the storage address of the data that is in the primary volume is located before the address currently indicated by the data replication pointer.

19. The computer program product according to claim 15, wherein the instructions further cause the primary data storage to obtain a time required for the replication as the ratio.

20. The computer program product according to claim 19, wherein when replicating the differential data from the primary volume to the secondary volume according to the storage address of the differential data, the instructions further cause the primary data storage to:

perform each round of differential data replication according to a sequence in which a data replication pointer points to from a start address in the primary volume to an end address in the primary volume; and replicate the differential data from the primary volume to the secondary volume according to the storage address of the differential data that is located in the primary volume, wherein the data replication pointer is used to point to an address of differential data that is currently being replicated.

21. The computer program product according to claim 20, wherein when replicating the differential data from the primary volume to the secondary volume according to the storage address of the differential data that is located in the primary volume, the instructions further cause the primary data storage to:

receive, by the primary volume and from the system host, the data;

replicate the data from the primary volume to the secondary volume in a current round of replication when a storage address of the data that is in the primary volume is located after an address to which the data replication pointer currently points; and skip replicating the data in the current round of replication when the storage address of the data that is in the primary volume is located before the address currently indicated by the data replication pointer.

22. The computer program product according to claim 15, wherein the ratio comprises only the data amount and the bandwidth.

* * * * *

UNITED STATES PATENT AND TRADEMARK OFFICE
CERTIFICATE OF CORRECTION

PATENT NO. : 11,093,335 B2
APPLICATION NO. : 15/405996
DATED : August 17, 2021
INVENTOR(S) : Xiuwu Wang and Ji Ouyang It is certified that error appears in the above-identified patent and that said Letters Patent is hereby corrected as shown below:

In the Claims

Claim 14, Column 12, Line 66: "volume data seize by a and from" should read "volume and from"

Signed and Sealed this
Ninth Day of November, 2021

Drew Hirshfeld
*Performing the Functions and Duties of the
Under Secretary of Commerce for Intellectual Property and
Director of the United States Patent and Trademark Office*